US010383183B2

(12) United States Patent
Hall et al.

(10) Patent No.: US 10,383,183 B2
(45) Date of Patent: Aug. 13, 2019

(54) MICROWAVE OVEN WITH OSCILLATING MAGNETRON

(71) Applicants: David R. Hall, Provo, UT (US); Andrew Priddis, Mapleton, UT (US); Matthew Liddle, Orem, UT (US); Jedediah Knight, Provo, UT (US)

(72) Inventors: David R. Hall, Provo, UT (US); Andrew Priddis, Mapleton, UT (US); Matthew Liddle, Orem, UT (US); Jedediah Knight, Provo, UT (US)

(73) Assignee: Hall Labs LLC, Provo, UT (US)

( * ) Notice: Subject to any disclaimer, the term of this patent is extended or adjusted under 35 U.S.C. 154(b) by 353 days.

(21) Appl. No.: 15/369,116

(22) Filed: Dec. 5, 2016

(65) Prior Publication Data

US 2018/0160488 A1 Jun. 7, 2018

(51) Int. Cl.
*H05B 6/66* (2006.01)
*H05B 6/64* (2006.01)
*H05B 6/70* (2006.01)

(52) U.S. Cl.
CPC ............ *H05B 6/664* (2013.01); *H05B 6/645* (2013.01); *H05B 6/705* (2013.01); *Y02B 40/146* (2013.01)

(58) Field of Classification Search
None
See application file for complete search history.

(56) References Cited

U.S. PATENT DOCUMENTS

| 4,939,333 A * | 7/1990 | Sakai | H05B 6/6411 |
| | | | 108/142 |
| 5,245,149 A * | 9/1993 | Pinna | B28B 11/241 |
| | | | 106/723 |
| 5,922,013 A * | 7/1999 | Fallik | A61N 5/02 |
| | | | 606/33 |
| 5,998,775 A * | 12/1999 | Sung | H05B 6/74 |
| | | | 219/709 |
| 7,015,440 B2 * | 3/2006 | Ryu | H05B 6/666 |
| | | | 219/404 |
| 7,388,180 B2 * | 6/2008 | Kim | H05B 6/6402 |
| | | | 219/695 |
| 2002/0005406 A1 * | 1/2002 | Fukunaga | H05B 6/6455 |
| | | | 219/711 |
| 2003/0047560 A1 * | 3/2003 | Yamauchi | F24C 15/2042 |
| | | | 219/757 |
| 2003/0098302 A1 * | 5/2003 | Hoh | H05B 6/6402 |
| | | | 219/749 |
| 2004/0134905 A1 * | 7/2004 | Noda | H05B 6/725 |
| | | | 219/749 |
| 2007/0102279 A1 * | 5/2007 | Novak | A62D 3/178 |
| | | | 204/157.6 |
| 2009/0095738 A1 * | 4/2009 | McNamee | H05B 6/6485 |
| | | | 219/679 |

(Continued)

*Primary Examiner* — Thor S Campbell

(57) ABSTRACT

A microwave oven is disclosed herein that includes a cooking cavity and a magnetron. The magnetron includes a body portion having an anode, a cathode, one or more magnets, and an antenna extending from the body. The antenna directs microwaves generated by the body to the cooking cavity. The magnetron is movably coupled to a housing surrounding the cooking cavity and the magnetron. For example, in one embodiment, the magnetron oscillates along three perpendicular dimensions of mobility.

19 Claims, 15 Drawing Sheets

(56) References Cited

U.S. PATENT DOCUMENTS

| | | | | |
|---|---|---|---|---|
| 2011/0198345 A1* | 8/2011 | Feilders | ............... | B01L 7/00 |
| | | | | 219/702 |
| 2013/0087555 A1* | 4/2013 | Hirano | ............... | H05B 6/666 |
| | | | | 219/720 |
| 2015/0136760 A1* | 5/2015 | Lima | ............... | H05B 6/705 |
| | | | | 219/709 |
| 2015/0361370 A1* | 12/2015 | Van Thorre | ............... | C10L 5/04 |
| | | | | 44/589 |
| 2016/0010015 A1* | 1/2016 | Van Thorre | ............... | C10L 5/363 |
| | | | | 44/590 |
| 2016/0088690 A1* | 3/2016 | Kubo | ............... | H05B 6/725 |
| | | | | 219/749 |
| 2017/0171922 A1* | 6/2017 | Sadahira | ............... | H05B 6/76 |
| 2018/0152991 A1* | 5/2018 | Hall | ............... | H05B 6/6402 |

\* cited by examiner

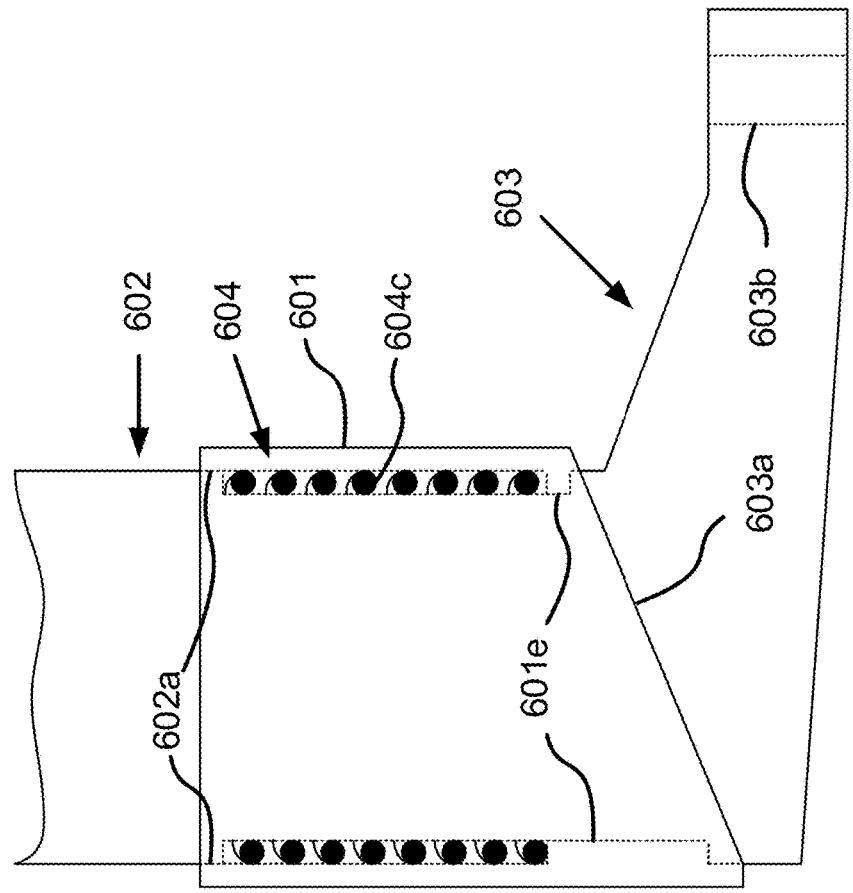
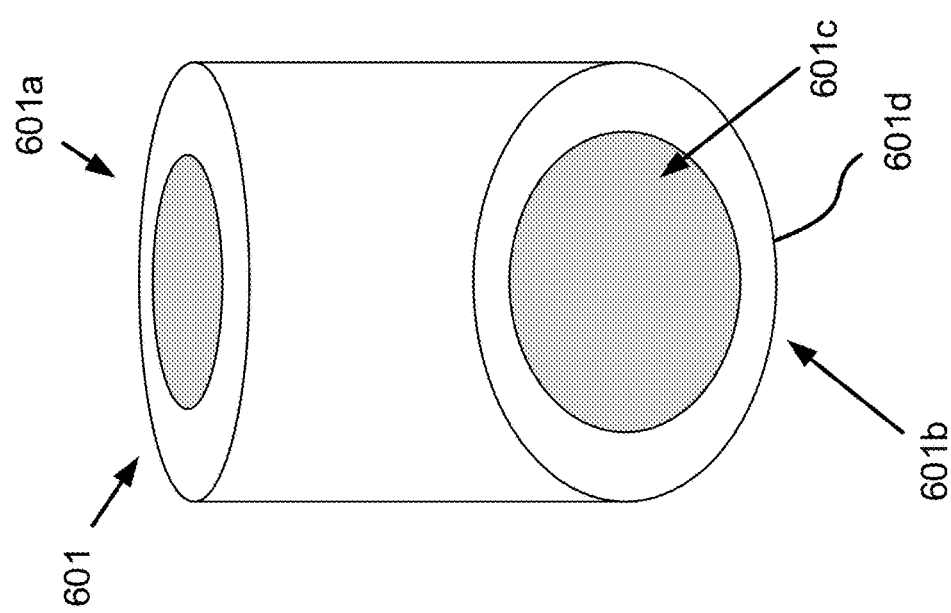
FIG. 6B
FIG. 6A

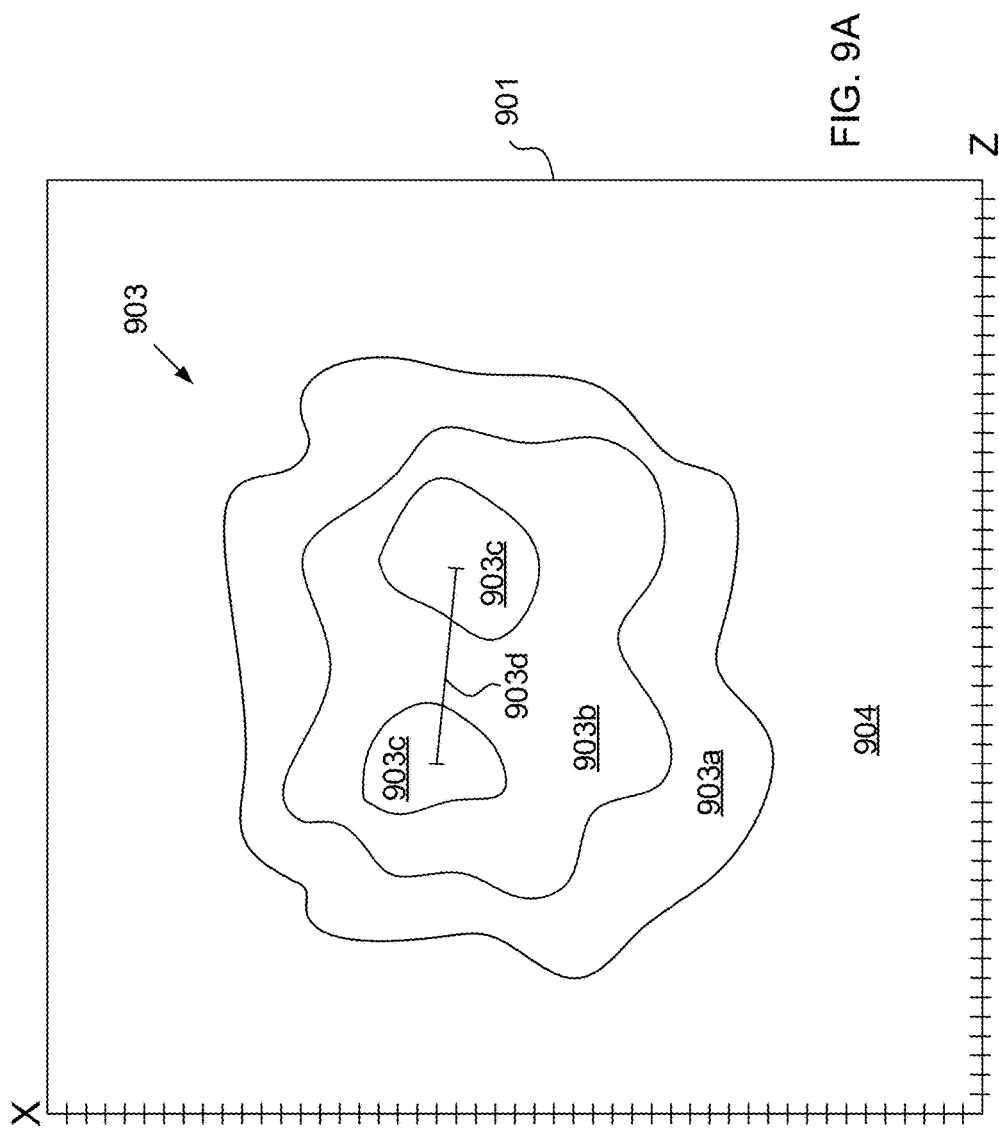

MICROWAVE OVEN WITH OSCILLATING MAGNETRON

TECHNICAL FIELD

This invention relates generally to the field of winches and hoists.

BACKGROUND

The modern microwave oven, for all its apparent sophistication, has stagnated in technological progress over the past decade. The immediate need for improvement is necessary in not just cooking thoroughness and uniformity, but also in capacity. Current solutions are severely limited. For example, the best-developed solution for uniform cooking so far is to rotate a plate. However, this only captures the variability of constructive interference of microwaves in two dimensions. Cooking uniformity also varies greatly with the amount of time needed to heat an object. For example, a thick and dense frozen food item will take longer to cook than a less thick and/or dense frozen food item. The additional time allows for greater kinetic cooking, which can generally lead to more uniform heating. However, foods that only take a relatively short while to heat are particularly prone to having some over-cooked zones and other under-cooked zones.

Another problem is the design flexibility of microwave ovens. Modern home design is moving towards lean and minimalistic features, while still providing all the modern conveniences, including microwave ovens. However, current ovens are not compatible with many new designs because of shape and power requirements, among other reasons. Thus, there are areas of needed improvement to accommodate changing housing needs.

SUMMARY OF THE INVENTION

A microwave oven is described herein that addresses some of the problems in the art described above. In general, the microwave oven includes a magnetron movably coupled to the microwave housing. The disclosed microwave oven provides several benefits over other microwave ovens. First, this microwave oven provides greater flexibility in microwave oven cooking cavity size because the zones of constructive interference move around the cavity, lessening the need for many zones distributed around the cavity. Second, the disclosed microwave oven requires less power while still providing more uniform cooking.

In one embodiment of the claimed invention, a microwave oven is disclosed that includes a cooking cavity and a magnetron. The magnetron includes a body portion having an anode, a cathode, one or more magnets, and an antenna extending from the body. The antenna directs microwaves generated by the body to the cooking cavity. The magnetron is movably coupled to a housing surrounding the cooking cavity and the magnetron. For example, in one embodiment, the magnetron oscillates along three perpendicular dimensions of mobility.

BRIEF DESCRIPTION OF THE DRAWINGS

A more particular description of the invention briefly described above is made below by reference to specific embodiments. Several embodiments are depicted in drawings included with this application, in which:

FIGS. 6A-E depict various views of portions of a magnetron oscillation mechanism according to the claimed invention;

FIGS. 9A-B depict example heat maps of images of irregularly-shaped food items captured by the infrared cameras.

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

The descriptions of the various embodiments include, in some cases, references to elements described with regard to other embodiments. Such references are provided for convenience to the reader, and to provide efficient description and enablement of each embodiment, and are not intended to limit the elements incorporated from other embodiments to only the features described with regard to the other embodiments. Rather, each embodiment is distinct from each other embodiment. Despite this, the described embodiments do not form an exhaustive list of all potential embodiments of the claimed invention; various combinations of the described embodiments are also envisioned, and are inherent from the descriptions of the embodiments below. Additionally, embodiments not described below that meet the limitations of the claimed invention are also envisioned, as is recognized by those of skill in the art.

Throughout the detailed description, various elements are described as "off-the-shelf." As used herein, "off-the-shelf" means "pre-manufactured" and/or "pre-assembled."

In some instances, features represented by numerical values, such as dimensions, quantities, and other properties that can be represented numerically, are stated as approximations. Unless otherwise stated, an approximate value means "correct to within 50% of the stated value." Thus, a length of approximately 1 inch should be read "1 inch+/−0.5 inch." Similarly, other values not presented as approximations have tolerances around the stated values understood by those skilled in the art. For example, a range of 1-10 should be read "1 to 10 with standard tolerances below 1 and above 10 known and/or understood in the art."

Figure 1:
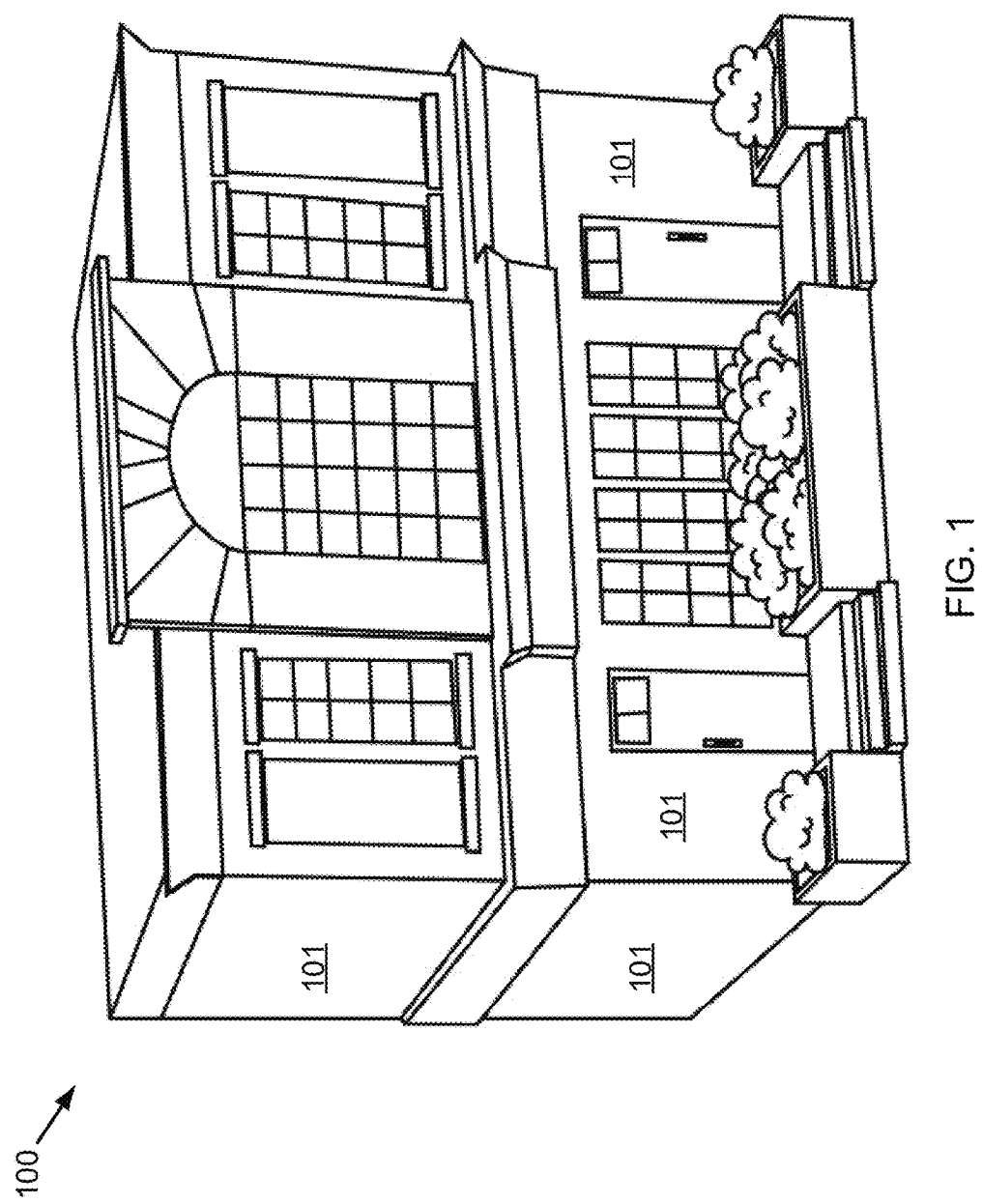
FIG. 1 depicts a perspective view of one embodiment of a modern building.

FIGS. 1-4D depict various aspects of a modern building having unique construction aspects that necessitate the improvements to the microwave oven described herein. FIG. 1 depicts a perspective view of one embodiment of such a building, structure 100. As shown, the outer finish of structure 100 is, in some embodiments, a facade with any variety of architectural embellishments. Inside outer walls 101, though unseen, is a building infrastructure comprising a plurality of conjoining modular building segments.

Figure 2:
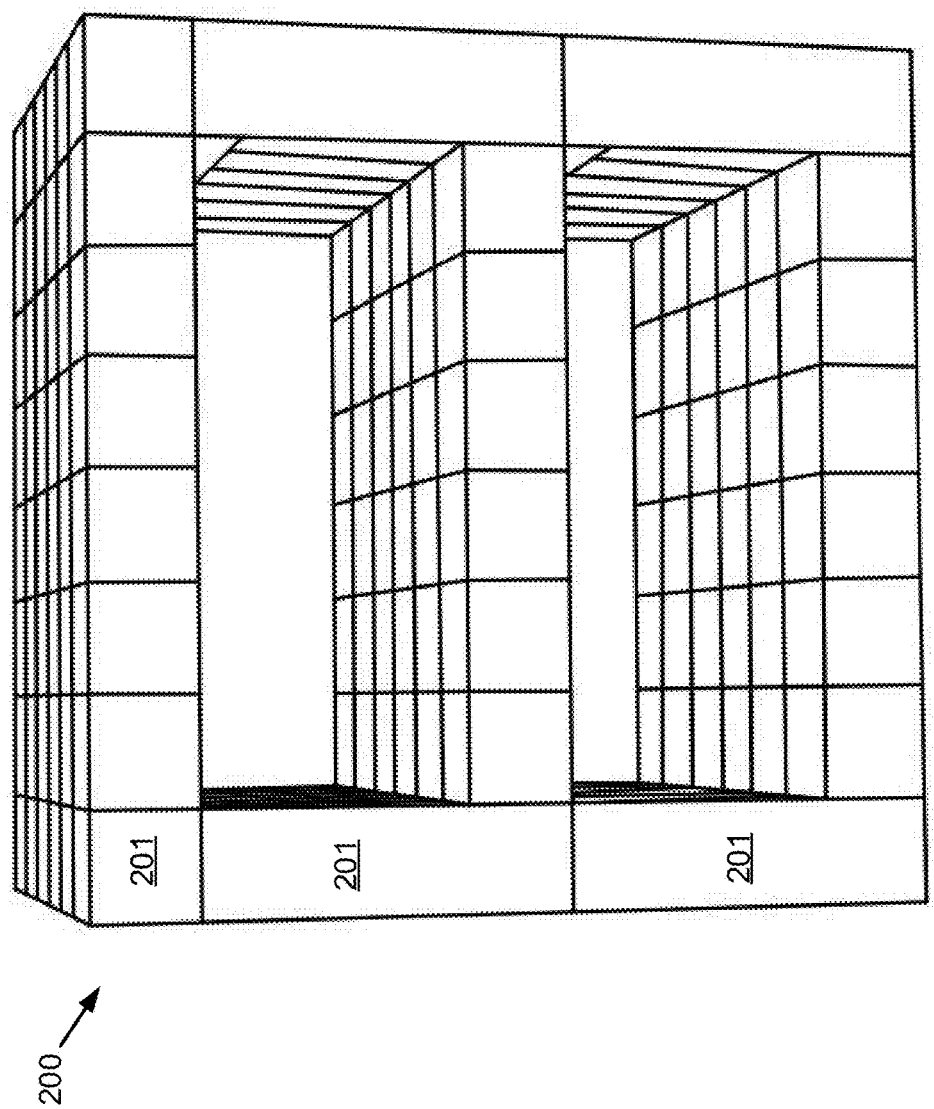
FIG. 2 depicts a building infrastructure.

FIG. 2 depicts building infrastructure 200, which comprises a plurality of conjoining modular building segments 201. As shown, the plurality of conjoining modular building segments are prismatic, box-like structures.

Figure 3:
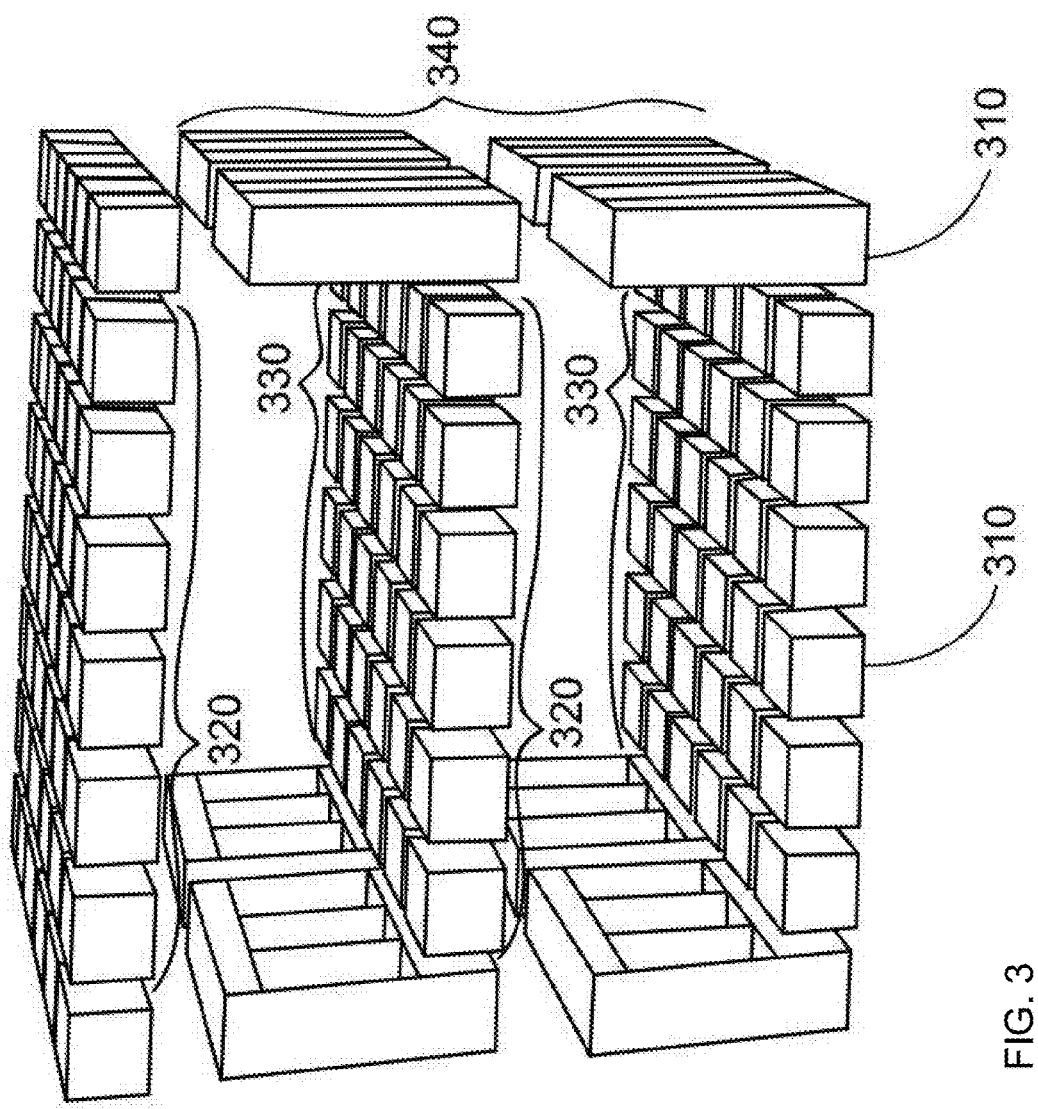
FIG. 3 depicts an exploded view of a building infrastructure.

FIG. 3 depicts an exploded view of a building infrastructure, similar to that depicted in FIG. 2, such that each individual prismatic box-like structure is visible. Building infrastructure 300 includes prismatic structures 310; a first selection 320 of the plurality of prismatic box-like structures, placed side by side horizontally and mechanically attached to form a length and width of at least one ceiling; a second selection 330 of the plurality of conjoining modular building segments are placed side by side horizontally and mechanically attached to form a length and width of at least one floor; and a third selection 340 of the plurality of conjoining modular building segments are placed side by side vertically and mechanically attached to each other and to at least one ceiling and at least one floor to form a plurality of walls for the building infrastructure.

FIGS. 4A-D depict perspective views of different embodiments of the prismatic box-like structures. The prismatic box-like structures may comprise different shapes, including shapes like cubic FIG. 4A, rectangular FIG. 4B, triangular FIG. 4C, and hexagonal FIG. 4D. Each prismatic box-like structure comprises at least three walls 400. Each prismatic box-like structure comprises an apparatus suitable for disposition of a stored item. A space 410 inside the walls measures at least one cubic foot in order that items can be stored within the prismatic box-like structures, thus maximizing space, efficiency, sustainability, and structural integrity of the building infrastructure.

Figure 4D:
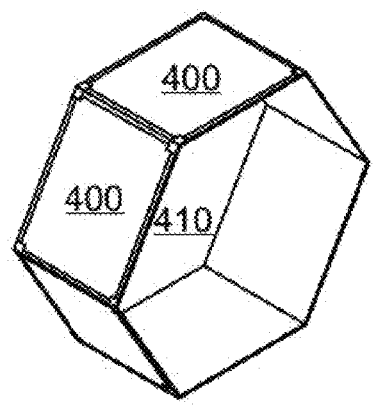
FIGS. 4A-D depict perspective views of different embodiments of the prismatic box-like structures
Figure 4A:
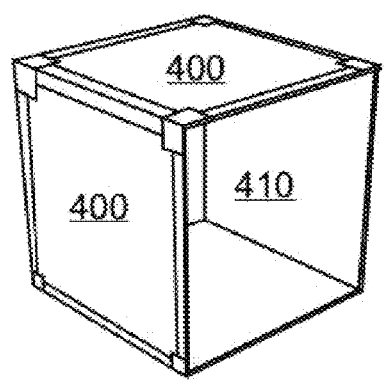
Figure 4C:
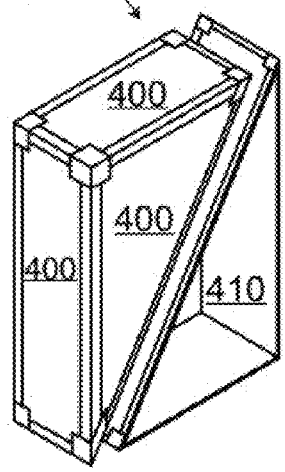
Figure 4B:
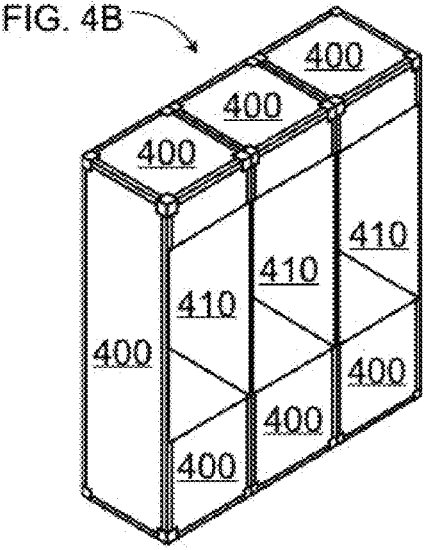

FIG. 4B depicts one unique structural arrangement in which the microwave oven of the claimed invention is, in various embodiments, particularly useful. As described above, the size of the prismatic structures is particularly chosen for efficiency, structural integrity. Power provisioning is likewise chosen to maximize these characteristics. Many current appliances, while individually compatible with the described infrastructure, are not collectively compatible, such as because of size and power requirements, among other reasons. Thus, new appliance designs are needed. The claimed microwave oven is one such appliance compatible with the unique building infrastructure described above.

In general, microwave ovens are subject to certain power and dimension limitations to function properly. Microwave frequencies range from 300 MHz to 300 GHz, but the most common frequency used in consumer microwave ovens is 2.45 GHz, which has a wavelength of approximately 12.2 cm. In commercial microwave ovens, the most common frequency is 915 MHz, which has a wavelength of 32.8 cm. This limits the size of microwaves to having at least two dimensions having lengths equal to a half-wavelength multiple to allow for resonance. Common power ratings range from 700 W to 1800 W, depending on the space available for a transformer and the power source the microwave oven is plugged in to. For example, counter-top microwave ovens are configured to be powered through a typical 110-V outlet, whereas some built-in and/or commercial microwave ovens are configured to be powered through a typical 220-V outlet.

While every variety of size and/or power is theoretically available by simply varying the frequency or power output, practical limitations, such as the commercial availability of transformers and magnetrons at desired frequencies, limit economical construction of microwave ovens outside of those commonly constructed. Additionally, frequencies between 2.4 and 2.5 GHz have been found over time to provide the best combination of penetration through objects being heated and absorption by water molecules. It is thus one object of the microwave oven disclosed herein to provide for flexibility within the current economical and practical restraints. FIGS. 5-10 depict various embodiments of such a microwave oven. In general, a microwave oven is described that includes a cooking cavity and an oscillating magnetron. The magnetron is movably coupled to a housing surrounding the cooking cavity and the magnetron. The magnetron includes a body portion that generates microwaves and an antenna that transmits the microwaves generated by the body portion. The body portion includes an anode, a cathode, and one or more magnets. The antenna extends from the body, and transmits the microwaves into the cooking cavity.

In various embodiments, the magnetron oscillates along three perpendicular dimensions of mobility. For example, in some embodiments, an oscillation mechanism couples the magnetron to the housing. One such oscillation mechanism includes a motor, a cylindrical collar, a transmission shaft, and a compression spring. The motor is fixedly coupled to the housing. The cylindrical collar has a sloped end and a flat end, where the flat end is fixedly coupled to the motor. In some embodiments, the motor housing and collar are cast together, forming a monolithic piece. The transmission shaft is slidably coupled to the motor and passes through the collar. The transmission has an angled foot extending from the sloped end of the collar at least partially perpendicularly to the transmission shaft. The foot is rotatably coupled to the magnetron, and has an angled surface complementary to the collar sloped end. The compression spring is disposed in the collar around the transmission shaft, and is coupled to the transmission shaft, the collar, or both. The spring exerts a force on the transmission shaft, the collar, or both, forcing the angled surface of the foot against the sloped end of the collar as the transmission shaft rotates.

The spring forces the angled surface against the sloped end in a variety of ways. In some embodiments, the collar includes a slot along an interior wall of the collar, and the spring includes an outwardly-bent end extending into the slot. The slot has a height greater than or equal to the diameter of a wire that forms the spring to accommodate the outwardly-bent end. In some embodiments, the slot has a length along the circumference of the interior wall greater than or equal to the diameter of the spring wire. For example, in one embodiment, the slot runs along the entire circumference of the interior wall, encircling the transmission shaft and spring. In another embodiment, the slot has a length along the circumference of the interior wall less than or equal to 105% of the spring wire's diameter. Similarly, in some embodiments, the slot has a height less than or equal to 105% of the spring wire's diameter, and a depth less than or equal to a depth from the collar's interior wall to an exterior wall of the collar. Generally, in various embodiments, the slot is disposed between the sloped end and the flat end. In some embodiments, the slot is disposed along a side of the collar having a length greater than a shortest side of the collar, where the slot is disposed further from the flat end of the collar than a furthest point of the shortest side of the collar is disposed from the flat end.

In various embodiments, the transmission also includes a slot, similar to the slot in the interior collar wall, along an exterior surface of a portion of the transmission shaft within the collar. The spring includes an inwardly-bent end extending into the slot, and the slot has a height greater than or equal to the diameter of the wire that forms the spring. Generally, the slot has a length along the circumference of the exterior surface greater than or equal to the diameter of the spring wire. In one embodiment, the slot runs along the entire circumference of the exterior surface. In other embodiments, the slot has a length along the circumference of the exterior surface less than or equal to 105% of the spring wire's diameter. Additionally, in some embodiments, the slot has a height less than or equal to 105% of the spring wire's diameter.

In some embodiments of the oscillation mechanism, the spring is disposed between a first lip along the internal wall of the collar and a second lip along the external surface of a portion of the transmission shaft disposed within the collar. This allows free rotation of the spring about the transmission shaft as it is compressed between the first and the second lip. In some embodiments, the first and/or the second lip extend along the entire circumference of the internal wall or external surface, respectively. In other embodiments, the first and/or the second lip extend only partially along the circumferences.

Some embodiments of the oscillation mechanism omit the spring. Instead, an air-tight, pressurized cavity is disposed between a first lip extending inwards from the interior wall of the collar and a second lip extending outwards from the exterior surface of a portion of the transmission shaft disposed within the collar.

Coupling the magnetron to an oscillation mechanism creates an advantage of being able to more uniformly cook objects by targeting areas in the object not well-heated as cooking of the object proceeds. One method of targeting such areas includes using infrared cameras to identify thermal differences along the surface of the object being cooked. Thus, in some embodiments of the claimed invention, the microwave oven includes two infrared cameras, each directed along separate, perpendicular axes across the cooking cavity. The microwave oven further includes a controller having one or more hardware processors and hardware memory. The memory stores instructions for targeting the cook zones that are executed by the processors. The targeting process includes detecting a three-dimensional heat profile of the object using the infrared cameras and adjusting a position of the magnetron based on the heat profile.

In some embodiments of the claimed microwave oven, the hardware memory stores instructions, executed by the processors, for saving a cooking profile for a particular object. The process includes receiving an object name, determining a size of the object based on the heat profile, and storing, in the memory, the object name, the size of the object, the heat profile, and a magnetron adjustment pattern based on adjustments made as the object is heated. This saves memory in the processors as similar objects are cooked in the future.

The figures described below disclose the microwave oven described above, including the various embodiments, in enough detail to enable one of skill in the art of microwave ovens to make and/or use the microwave oven claimed herein. In some cases, features of certain embodiments are exaggerated and/or simplified to convey more clearly to one of skill in the art the scope of the disclosure. It is understood that, generally, the features in the embodiments shown are not drawn to scale.

Figure 5A:
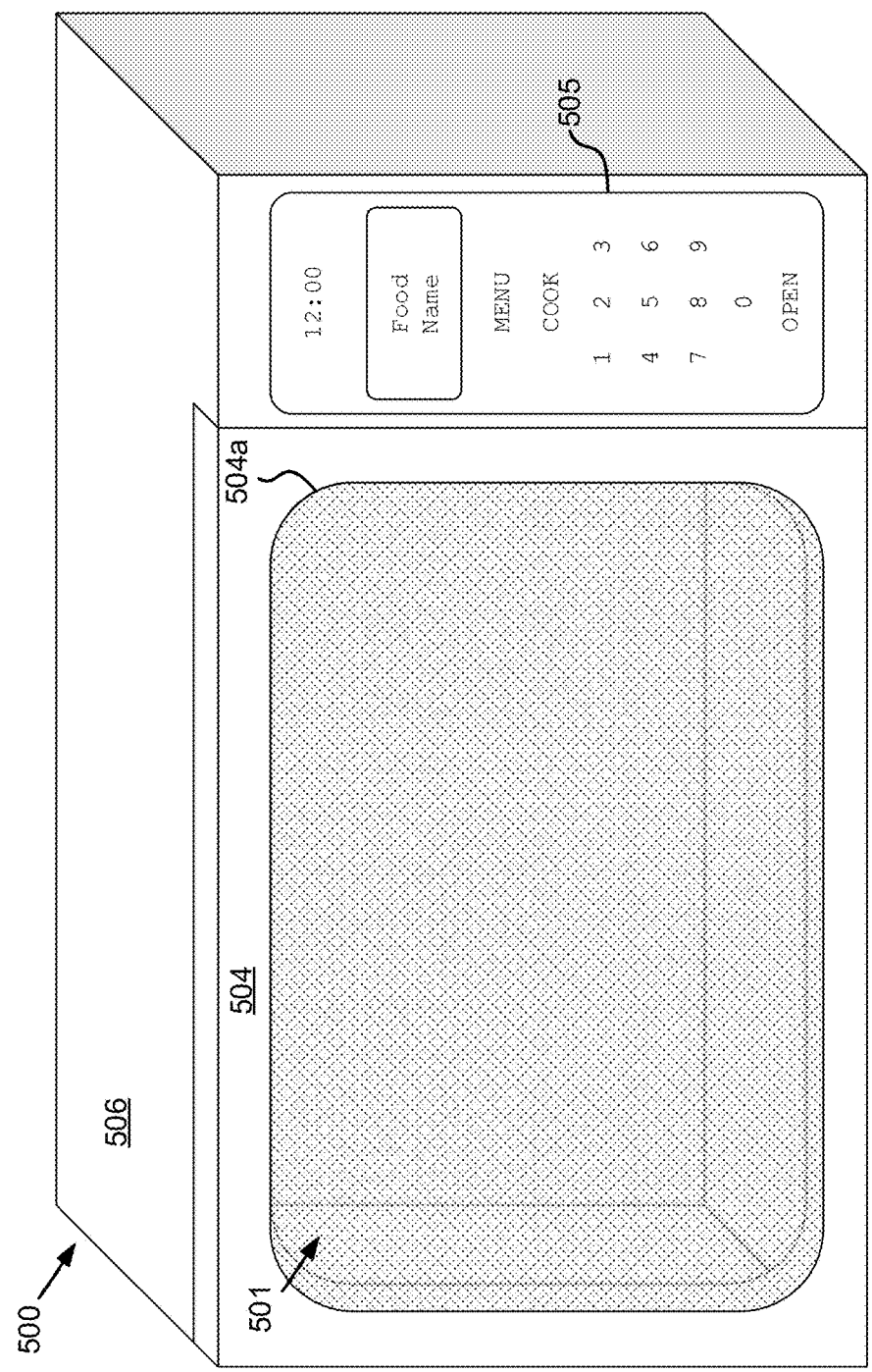
FIGS. 5A-B depict two embodiments of a microwave oven according to the claimed invention.
Figure 5B:
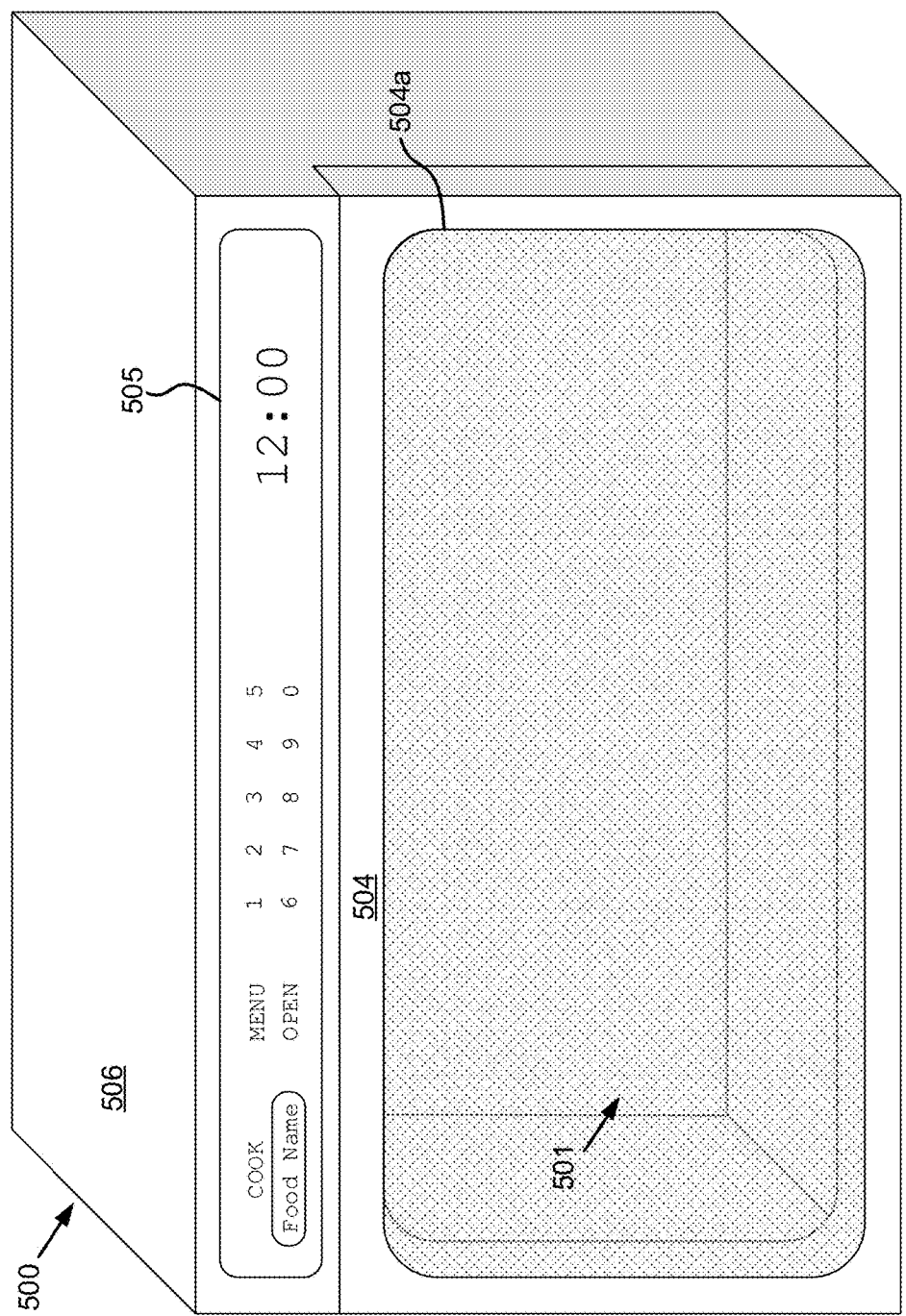

FIGS. 5A-B depict two embodiments of a microwave oven according to the claimed invention. Microwave oven 500 includes cooking cavity 501, door 504, control panel 505, and housing 506. Within housing 506 and behind control panel 505 is an electronics cavity (similar to that depicted in, and described below regarding, FIG. 8) that houses various electronic components of microwave oven 500, including a magnetron, a magnetron oscillation mechanism, a power transformer, a rectifier, a cooling fan, and a controller.

The cooking cavity is constructed similar to other microwave oven cavities typical in the industry. Thus, the walls are reflective to microwaves, and are capable of withstanding temperatures typically reached in microwave ovens. Additionally, the walls are designed to withstand steam accumulation and heat transfer, and, in some embodiments, are non-stick, and thus can be easily cleaned. For example, in some embodiments, standard commercially-available microwave oven paint is used to coat the interior walls of the cooking cavity.

The door is comprised, on a side of the door facing the cooking cavity, materials similar to those forming the cooking cavity, and on a side of the door facing away from the cooking cavity, any of a variety of materials, such as stainless steel, aluminum, or plastic, to name a few. Generally, the door is comprised of materials commonly used in manufacturing microwave oven doors. The door includes viewing port 504a, which is generally formed of a glass or microwave-safe plastic material having metal strands running through the glass or plastic to reflect the microwaves. In some embodiments a perforated metal plate is disposed between the viewing port and the cooking cavity. The door is, in various embodiments, secured by a detent or an electromagnet. For example, in the depicted embodiment, the door is electromagnetically latched closed. A permanent magnet is installed in the door, and a corresponding electromagnet and weak permanent magnet are installed in the body of microwave oven 500. When a user presses the "OPEN" button on the control panel, the direction of the current running through the electromagnet is switched momentarily (for up to 2-3 seconds in some cases), reversing the direction of the magnetic field generated by the electromagnet. The reverse magnetic field is stronger than the force generated by the magnetic fields of the permanent magnets in the door and the body, and forces the door open.

Figure 8:
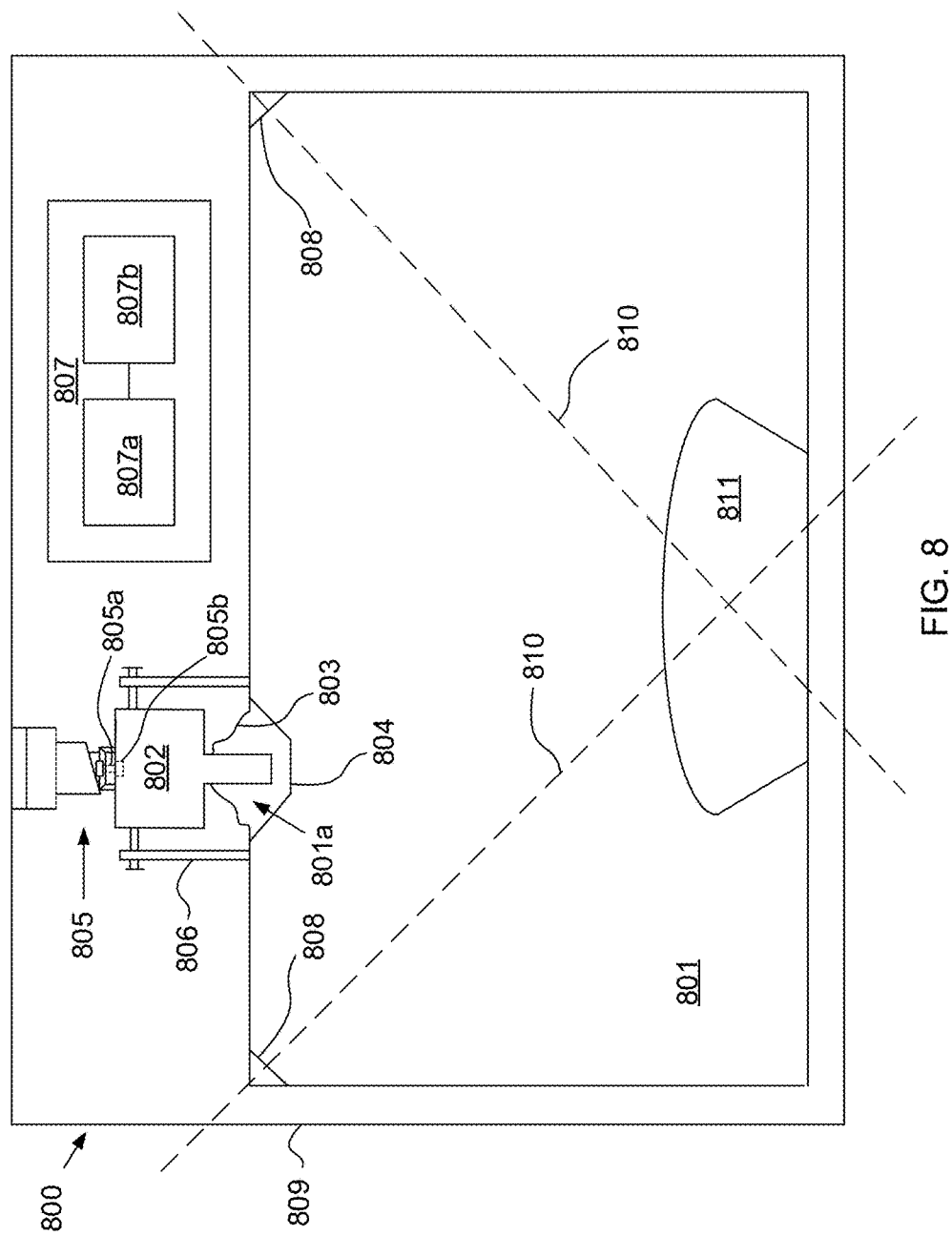
FIG. 8 depicts a section view of a microwave oven according to the claimed invention, including selected components.
Figure 9B:
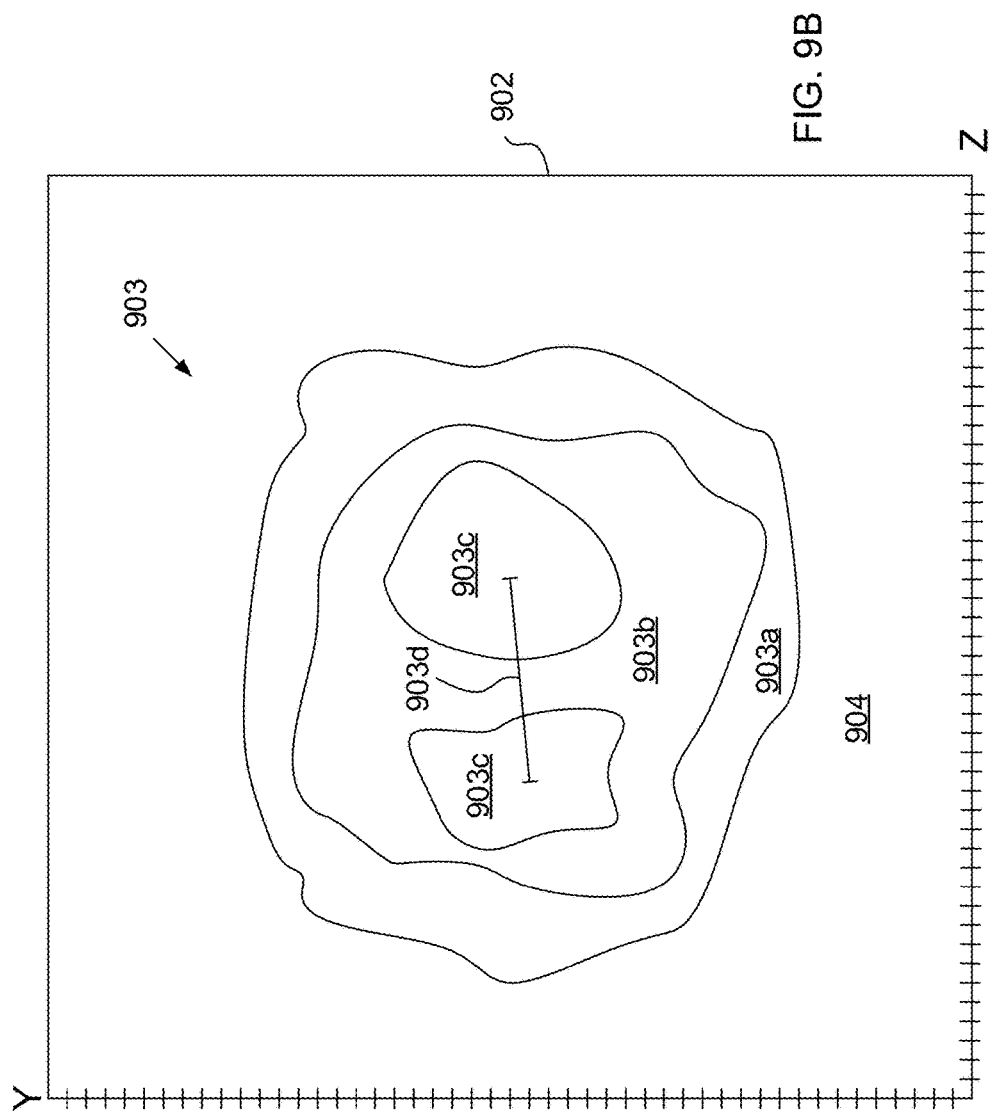

The control panel is, generally, an interface that allows the user to interact with processors and memory that control operation of the microwave oven (described in more detail regarding FIGS. 8-9B). In some embodiments, the control panel is a graphical user interface displayed on a touchscreen. In other embodiments, the control panel includes push buttons. In yet other embodiments, the control panel includes permanent markings on or over a touchscreen.

The hardware processors and memory store instructions for operating microwave oven 500. In various embodiments, those instructions include identifying a power level either desired or necessary, identifying an amount of time needed for cooking, and delivering power to the magnetron via the transformer. In some embodiments, some or all of these steps are automated. For example, in one embodiment, the microwave oven includes one or more diodes facing into the cooking cavity. The processors use the diodes to determine whether the cooking cavity contains an object or objects to be heated and powers the magnetron accordingly.

The housing is comprised of any of a variety of materials typical for microwave ovens, and includes various metals and/or plastics. At least a portion of the housing is metal to provide grounding for the electronics that power microwave oven 500. Generally, the housing is sturdy enough to provide structural support for one or more of the magnetrons, the magnetron oscillation mechanism, the power transformers, the cooking cavity, and the controller.

FIGS. 6A-E depict various views of portions of a magnetron oscillation mechanism according to the claimed invention. The oscillation mechanism translates the rotation of a shaft from a motor into three-dimensional motion of a magnetron, and provides structural support for the magnetron. Some of the features depicted regarding the oscillation mechanism are exaggerated relative to some actual embodiments of the oscillation mechanism to allow for efficient depiction and description.

FIG. 6A depicts collar 601. The collar has flat end 601*a*, sloped end 601*b*, channel 601*c*, and sloped-end lip 601*d*. FIG. 6B depicts transmission shaft 602 passing through the channel in the collar, foot 603, and spring 604.

The collar, the shaft, and the foot are made of materials having enough flexural strength to support the magnetron. Generally, microwave oven magnetrons weigh between 1.5 lbs and 3.5 lbs. In order to move along three dimensions, the magnetron is not fixed to any portion of the microwave oven besides the oscillation mechanism. Thus, in various embodiments, the collar, shaft, and/or foot are comprised of steel. For example, in one embodiment, the collar is steel and is cast with the motor housing such that the motor housing and the collar are monolithic. In some embodiments, the collar is comprised of a durable, high-strength plastic such as ABS or PVC. For example, in one embodiment, the collar and motor housing are monolithic, but are formed of ABS or PVC. In some embodiments, the motor housing is formed of plastic, and the collar is formed of steel. In one embodiment, the shaft and foot are monolithically cast steel. In some embodiments, the collar, shaft, and/or foot are coated with a dielectric material, such as Teflon, to prevent charge build-up on the magnetron from grounding through the oscillation mechanism's motor.

Though the foot is shown as elongated (roughly having twice the length of the diameter of the collar), in various embodiments the foot is shorter. In general, the length of the foot is chosen based on the desired change in the interference pattern of microwaves in the cooking cavity, the period of the oscillation of the microwave, and the periodicity of the changing interference pattern. In general, as the length of the foot increases, the periodicity of the changing interference pattern increases as the period of the oscillation remains fixed. Additionally, in various embodiments, the mounting channel 603*b*, through which a steel flanged bolt is passed that mounts the magnetron to the foot, is shown as significantly more narrow than the collar. However, in various embodiments, the channel and bolt have a diameter ranging up to equal to the diameter of the shaft or the collar. In some embodiments, the channel and bolt diameters are larger than either the shaft or the collar diameter. The flanged bolt is depicted in FIG. 8.

Figure 6C:
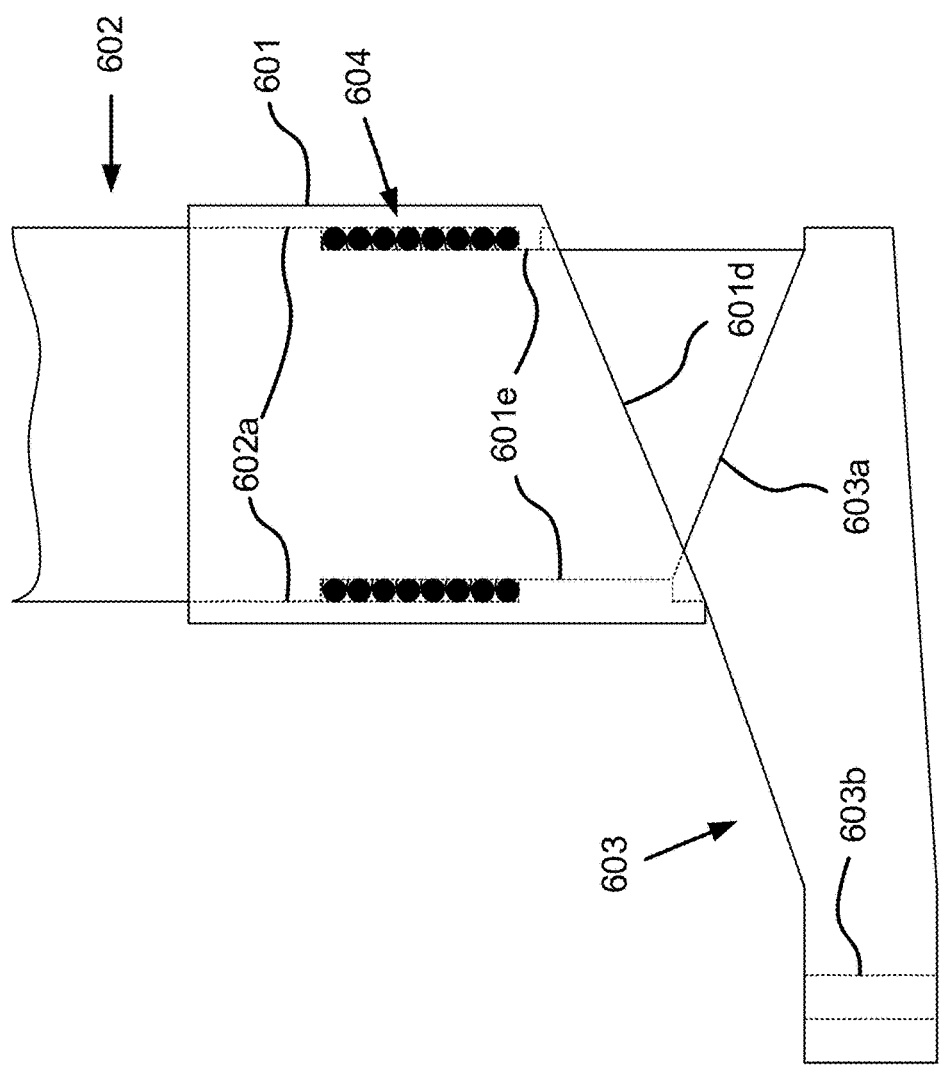

The shaft is coupled to, and rotated by, a motor (not shown, but depicted in, and described regarding FIG. 8). The shaft is fixedly coupled to the foot such that, as the shaft is rotated, the foot rotates. The foot includes angled lip 603*a* and mounting channel 603*b*. The angled lip presses against the sloped-end lip and slides against the sloped-end lip at the shaft and foot are rotated. Because the collar is sloped, rotation of the foot forces the shaft and foot down. The spring, which, in FIGS. 6B-C, is pinned between interior collar lip 601*e* and exterior shaft lip 602*a*, provides the counter-force that forces the shaft and foot back up as they continue to rotate. The mounting channel allows a bolt to couple the foot to a magnetron (such as that described below regarding, and depicted in, FIGS. 7-8).

FIG. 6C shows the shaft and the foot rotated 180° compared with FIG. 6B. As shown, the forces exerted by the spring and the sloped-end and angled lips pressing against each other results in downward translation of the shaft and foot relative to the collar. The downward translation of the shaft relative to the collar compresses the spring between the interior collar lip and the shaft lip. As the shaft and foot continue to rotate, the spring forces the angled lip to slide up along the sloped-end lip, raising the shaft and the foot to their starting height relative to the collar.

Figure 6D:
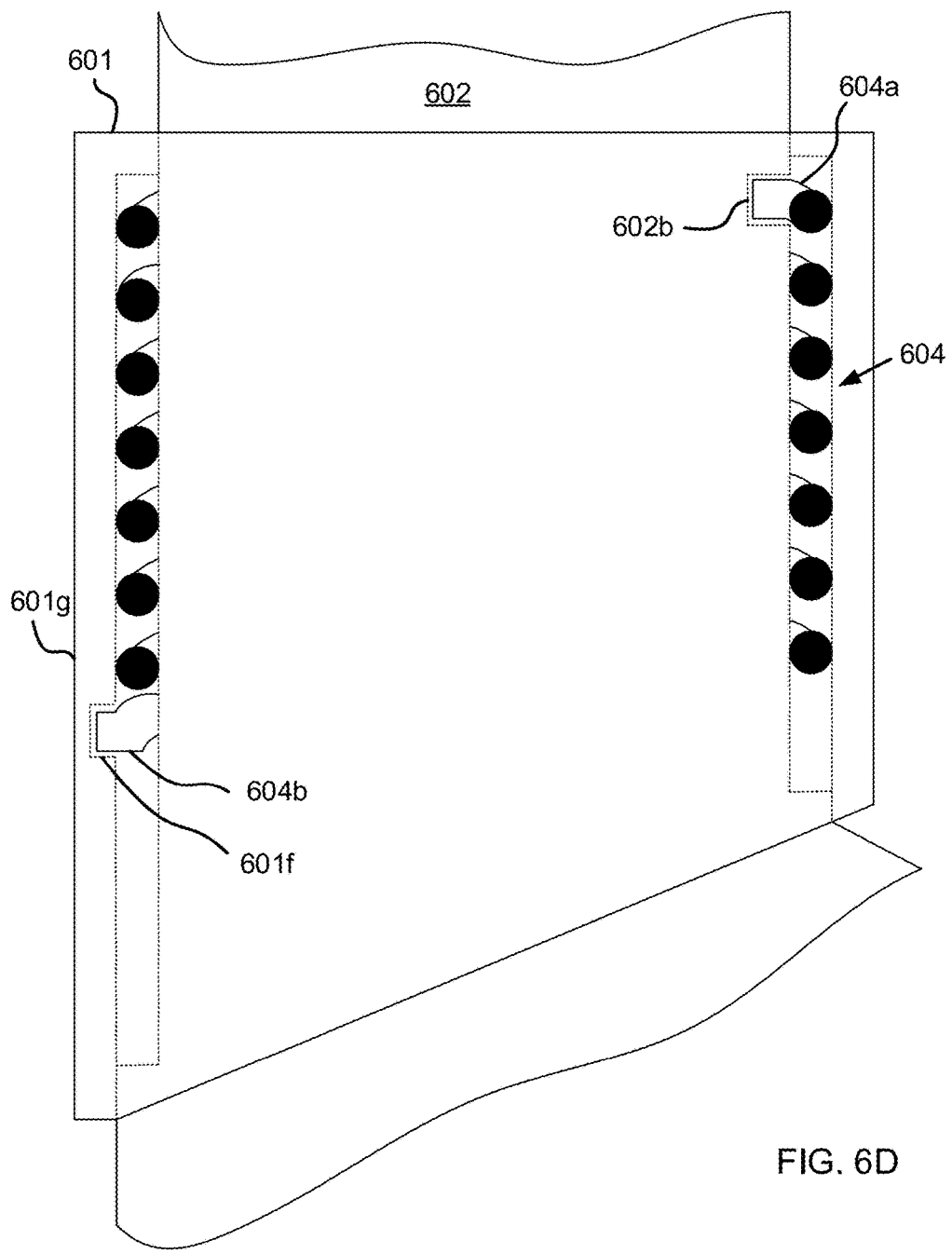

FIG. 6D shows an alternative embodiment of the spring coupling to the shaft and collar. As shown, in some embodiments, instead of pinning the spring between complementary lips, the ends of the spring are bent into slots in the shaft and the collar. In the depicted embodiment, the upper end 604*a* of the spring is bent inwards into the slot 602*b* in the shaft, and the lower end 604*b* of the spring is bent outwards into the slot 601*f* in the interior wall of the collar. Generally, the slots have a height and length (the length runs along the circumference) at least equal to the diameter of the wire 604*c* forming the spring. In some embodiments, the height ranges up to 105% of the diameter of the wire. Furthermore, in some embodiments, the length of the slots ranges up to the entire circumference of the wire. The depth of the collar slot ranges up to the depth between the collar's interior wall and the exterior wall 601*g*. The depth of the shaft slot ranges, in various embodiments, up to the entire diameter of the shaft.

Figure 6E:
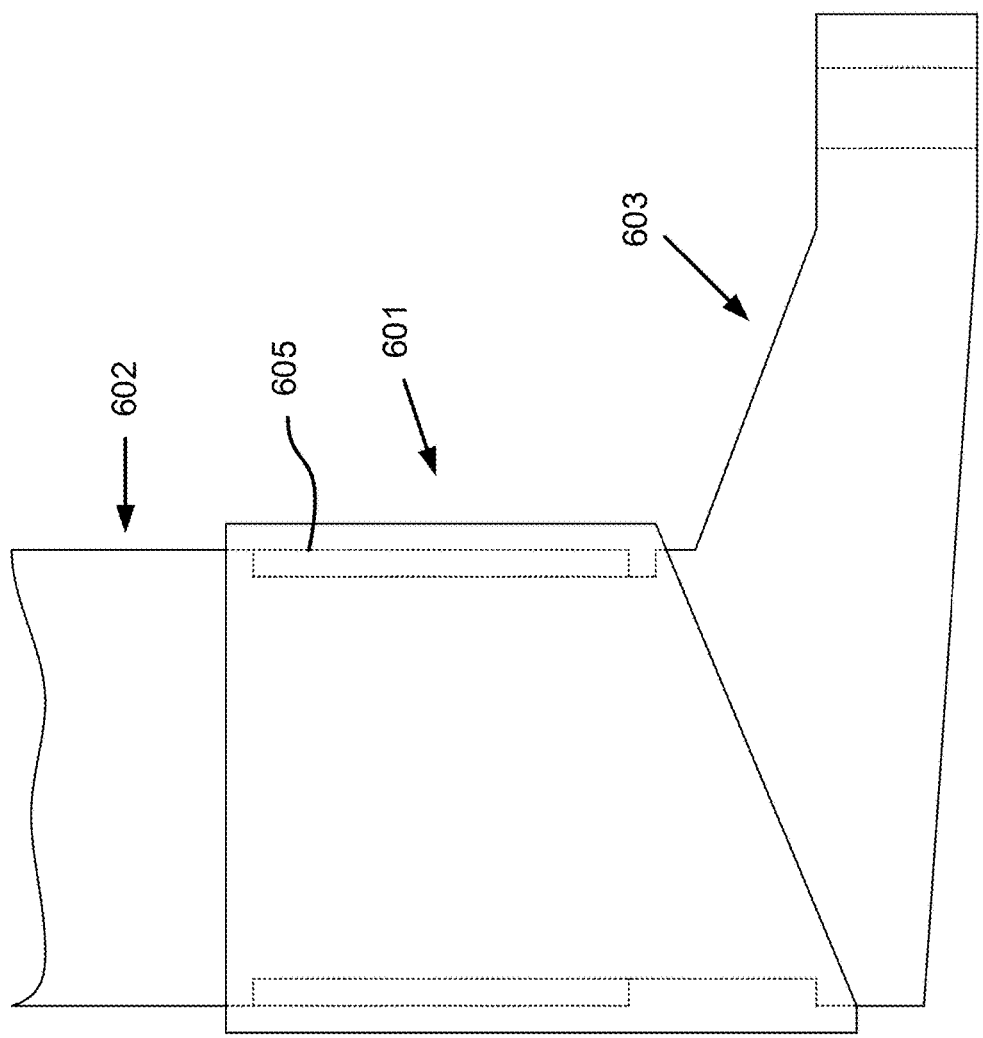

FIG. 6E shows another alternative embodiment of the oscillation mechanism, this embodiment omitting the spring. Instead, an air-tight, pressurized cavity 605 is disposed between the interior collar lip and the shaft lip. Thus, the collar and shaft lips include, in some embodiments, an O-ring or other seal. Though not shown, in such embodiments, the collar includes a one-way valve for pressurizing the cavity. This is particularly beneficial in extending the life of the oscillation mechanism because the cavity can be re-pressurized as it loses pressure over time.

Figure 7:
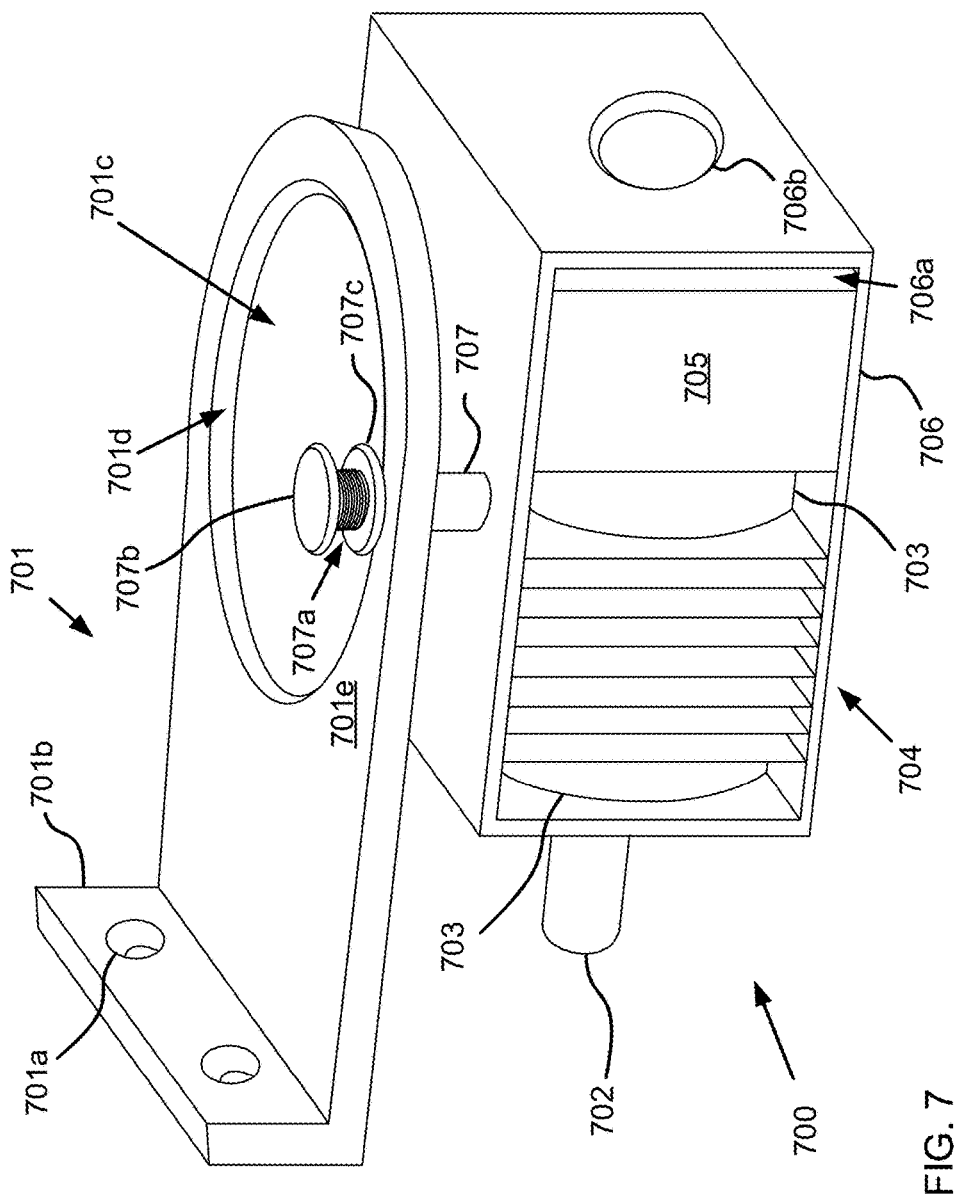
FIG. 7 depicts one embodiment of a magnetron and support bracket according to the claimed invention.

FIG. 7 depicts one embodiment of a magnetron and support bracket according to the claimed invention. Magnetron 700 is supported, in part, by support bracket 701. The magnetron includes components common to magnetrons, including antenna 702, permanent magnets 703, heat sinks 704, filter box 705, and yoke 706. However, this magnetron is unique compared to other magnetrons in that the yoke also surrounds the filter box, with space 706*a* between the filter box and the yoke, which allows room for a flanged bolt that mounts the magnetron to an oscillation mechanism (such as is described above regarding FIGS. 6A-E). The flanged bolt passes through mounting channel 706*b*, which has a diameter larger than the diameter of the bolt, but smaller than the diameter of the flange. Additionally, in some embodiments, the mounting channel is off-center on the yoke.

The support bracket is, in the depicted embodiment, coupled to a cooking cavity. However, in various embodiments, the support bracket is mounted to a housing surrounding the microwave oven adjacent to the oscillation mechanism. In the depicted embodiment, bolts that pass through openings 701*a* in support flange 701*b* to mount the support bracket. However, in other embodiments, the support bracket is welded in place. In some embodiments, one support bracket is provided for each side of the magnetron (excluding the antenna and mounting ends). The magnetron is supported by the support bracket via support rod 707. The support rod is directly coupled to the yoke, and includes compression spring 707*a* disposed between flanges 707*b,c*. The bottom flange is fixed to the spring and is slidably disposed around the rod. The rod extends through circular opening 701*c* and is forced against wall 701*d* of the circular opening by the oscillation of the magnetron in the direction caused by the collar. The bottom flange is forced against top surface 701*e* of the support bracket by the oscillation of the magnetron caused by the foot.

One benefit of the support bracket and rod is to relieve the flexural force exerted on the transmission shaft, the foot, the mounting bolt, and the yoke by the weight of the magnetron. The weight of the magnetron is exacerbated by the fact that the magnetron is mounted at one end to the oscillation mechanism, creating a significant torque on the oscillation mechanism components and the yoke. Though the rod is depicted towards the center of the magnetron, in some embodiments, the torque on the yoke and oscillation mechanism components is most greatly reduced by positioning the rod on the yoke above an end opposite where the oscillation mechanism is coupled to the yoke. In the depicted embodiment, the opposite end is the antenna end.

FIG. 8 depicts a section view of a microwave oven according to the claimed invention, including selected components. Microwave oven 800 includes cooking cavity 801, magnetron 802, waveguide 803, antenna cover 804, oscillation mechanism 805, support brackets 806, controller 807, infrared cameras 808, and housing 809. The cooking cavity, magnetron, oscillation mechanism, support brackets, controller, and housing are similar to those already described above. However, in the present embodiment, the controller additionally includes instructions for operating the infrared cameras, which instructions are described in more detail regarding FIGS. 9A-10B. Additionally, mounting bolt 805*a* with flanges 805*b* is shown mounting the magnetron to the oscillation mechanism.

In the depicted embodiment, the waveguide is a concave portion of the cooking cavity, within which antenna 802*a* is disposed. However, various other embodiments include a variety of waveguide structures. Generally, the waveguide is formed of a flexible, microwave-reflective material, such as Mylar, and is fixed to the base of the antenna and the edges of cooking cavity opening 801*a*, through which microwaves are transmitted into the cooking cavity. The size of the cavity opening depends on the range of oscillation of the antenna. In various embodiments, this range varies from one-eighth of a wavelength to one-half of a wavelength (roughly half an inch to two-and-a-half inches). The antenna cover is a thin, rigid structure over the antenna that is microwave-transparent (such as a thin sheet of dielectric plastic) and functions to shield the antenna from food splatter and/or steam in the cooking cavity. As depicted, because the antenna extends partially into the cavity, the antenna cover is convex, and has a depth that varies proportionally with the range of oscillation of the antenna. However, in some embodiments, as is common in many current microwave oven designs, the antenna does not extend into the cavity, and the antenna cover is flat.

Each infrared camera includes a lens that focuses light onto a panel of infrared photosensors. The lens, in some embodiments, is a fish-eye lens. Electronic signals generated by the photosensors are sent to the controller and are processed by processors 807*a* based on instructions stored in memory 807*b*. The infrared cameras are aligned along perpendicular axes 810 that intersect in a portion of the cooking cavity where food 811 is most likely to be placed by a user. However, it is only important that the user place the food in the cavity where both cameras can capture the food. Thus, in some embodiments, the cavity includes markings that indicate to the user the area where the camera images overlap.

FIGS. 9A-B depict example heat maps of images of irregularly-shaped food items captured by the infrared cameras. FIG. 9A depicts snapshot 901 from one infrared camera, and FIG. 9B depicts snapshot 902 from a second infrared camera (the cameras being similar in structure, function and implementation to those described above). The first snapshot shows food item 903 along an x- and a z-axis, and the second snapshot shows the food item along the z-axis and a y-axis perpendicular to the x-axis. The food item is characterized by thermal zones 903*a,b,c*, and the cooking cavity is characterized by thermal zone 904. Thermal zones 903*c* are separated from the centers by length 903*d*, which is approximately one half wavelength of the microwaves cooking the food item.

One limitation of infrared cameras is that such cameras are only capable of detecting surface temperatures. However, because of thermal propagation in materials, a three-dimensional temperature profile can be inferred from measured surface temperatures. As a food item in a microwave is heated, the cooking cavity maintains a roughly stable temperature, absorbing some heat from steam and direct contact with the food, and dissipating the heat to the air and other components surrounding the cooking cavity. Thus, throughout the cooking period, thermal zone 904 will have little variation. However, the outside surface of the food rapidly changes temperature as it absorbs the microwave radiation. Based on the change in temperature of the food, the processors recognize boundaries of the food item. Once the processors recognize the boundaries of the food item, the processors only store temperature information from within the boundaries, such as within the outer-most thermal zone 903*a*.

Penetration of the microwaves into the food depends on the food content and depth, but the heated portions of the food lose heat to the cooler portions beneath. Thus, surfaces of the food closer to cooler interior volumes of the food will also be cooler than surfaces of the food closer to warmer edge volumes of the food. Thus, thermal zone 903*a* will be hotter than thermal zone 903*b*. In some cases, because of constructive interference, thermal zones 903*c* will also be warmer than thermal zone 903*b*. The thermal zones are established based on temperature differences across the food item, rather than absolute temperatures, which allows for more precise measurement of three-dimensional temperature uniformity of the food. This is because the temperature difference of the surface of the food, in various embodiments, only varies a couple of degrees, such as up to 3 degrees Celsius, whereas the absolute temperature varies as much as 100-120 degrees Celsius. The absolute temperature variance between the cooking cavity and the food item also ranges up to 50-60 degrees Celsius in various cases. By focusing on temperature variation of just the food, the processors can more accurately determine the temperature uniformity of the food.

Figure 10A:
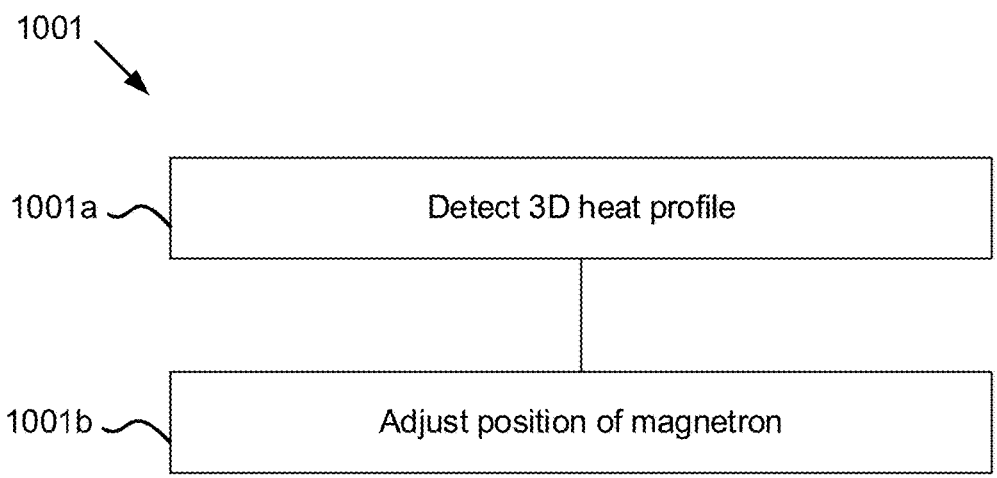
FIGS. 10A-B depict two methods of operating a microwave oven having infrared cameras, according to the claimed invention.
Figure 10B:
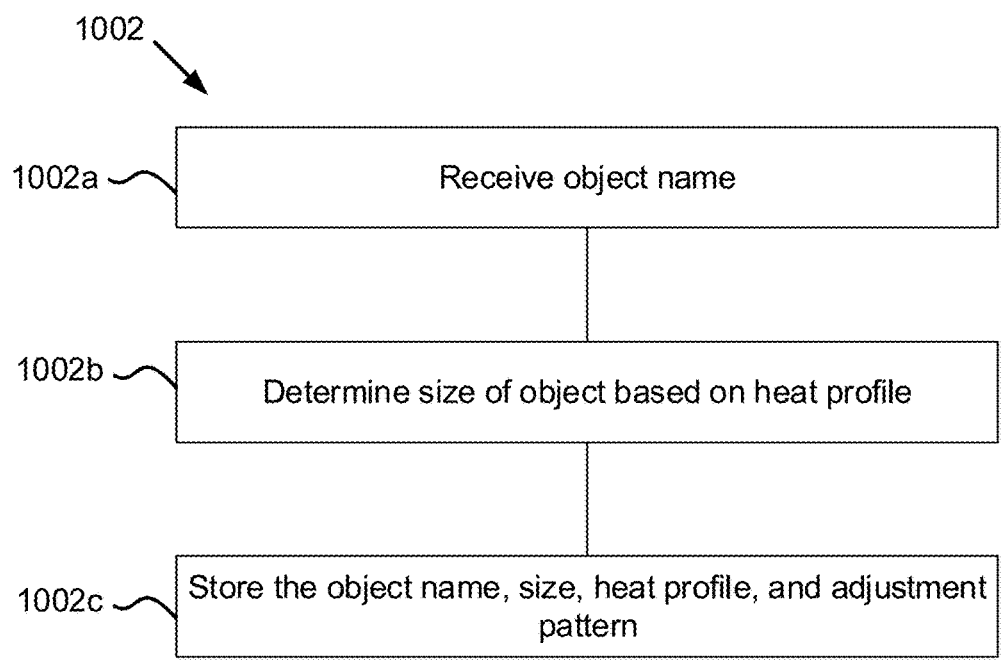

FIGS. 10A-B depict two methods of operating a microwave oven having infrared cameras, according to the claimed invention. In some embodiments, the microwave oven operates using standardized instructions. For example, in some embodiments, a standard oscillation pattern is used for the magnetron. This oscillation pattern includes, in various embodiments, a rotation rate that ranges from one rotation per minute to 30 rotations per minute. However, in some embodiments, as in the embodiment described below, specific operating parameters are used depending on the food being cooked. The methods described below are generally executed using a controller having hardware processors and hardware memory that stores, in computer-executable form, instructions for executing the steps outlined below.

FIG. 10A depicts method 1001 of uniformly cooking an object in a microwave. The method includes, at block 1001a, detecting a three-dimensional heat profile of the food being cooked, and, at block 1001b, adjusting the position of the magnetron based on the heat profile. Detecting the heat profile includes, in various embodiments, determining surface boundaries of the object being heated and determining the temperature variation of the surface of the food. In some embodiments, the method further includes determining an absolute temperature at which the food is done being cooked, such as receiving a food identifier from a user via a user interface electrically coupled to a controller that executes the method; and/or determining a minimum and/or a maximum threshold doneness temperature of the food, such as in a similar manner. The latter two steps are, in various embodiments, accomplished by accessing a food profile stored in hardware memory of the controller that includes cooking requirements for the food.

Adjusting the position of the magnetron includes, in various embodiments, identifying the rate at which the absolute surface temperature of the hottest thermal zones of the food changes and setting the oscillation rate based on the temperature change rate. In various embodiments, a faster temperature change corresponds to a faster oscillation. For example, in one embodiment, a temperature change of one degree per second corresponds with an oscillation rate of 30 rotations of the motor per minute. Additionally, in various embodiments, adjusting the position of the magnetron includes determining a rate at which the temperature difference of the various thermal zones of the food changes, and, based on a maximum rate, rotating the shaft of the motor to adjust the magnetron to a new position that shifts the zones of constructive interference to the cooler thermal zones. In some such embodiments, the controller stores positions of the motor, which includes a position encoder, that correlate with particular positions in the cooking cavity of constructive microwave interference. In other such embodiments, the controller stores a mathematical relationship that relates the movement of the magnetron to movement of the zones of constructive interference.

FIG. 10B depicts method 1002 of storing a food cooking profile for future use. The method includes, at block 1002a, receiving, such as from a user, a name of the object or food being cooked in the microwave; at block 1002b, determining a size of the food based on the heat profile, such as is described above; and, at block 1002c, storing the object name, size, heat profile throughout the cooking period, and the adjustment pattern calculated and used by the processors to cook the food. Storing this information saves memory during future cooking events by allowing the controller to access and execute the stored adjustment pattern instead of having to calculate the optimal adjustment pattern on-the-fly.

The invention claimed is:

1. A microwave oven, comprising:
   a cooking cavity;
   an magnetron comprising:
      a body comprising an anode, a cathode, and one or more magnets; and
      an antenna extending from the body that directs microwaves generated by the body to the cooking cavity;
   a housing surrounding the cooking cavity and the magnetron; and
   an oscillating mechanism coupling the magnetron to the housing, the oscillating mechanism comprising:
      a motor fixedly coupled to the housing;
      a cylindrical collar having a sloped end and a flat end, the flat end fixedly coupled to the motor;
      a transmission shaft slidably coupled to the motor and passing through the cylindrical collar, the transmission shaft having an angled foot extending at least partially perpendicularly to the transmission shaft, wherein the foot is rotatably coupled to the magnetron, and wherein the foot comprises an angled surface complementary to the sloped end of the cylindrical collar; and
      a compression spring disposed in the cylindrical collar around the transmission shaft, the compression spring coupled to the transmission shaft, the collar, or both.

2. The microwave oven of claim 1, wherein the magnetron oscillates along three perpendicular dimensions of mobility.

3. The microwave oven of claim 1, the cylindrical collar comprising a first slot along an interior wall of the cylindrical collar, the interior wall having a circumference, the compression spring comprising an outwardly-bent end extending into the first slot, wherein the first slot has a height greater than or equal to a diameter of a wire that forms the compression spring.

4. The microwave oven of claim 3, wherein the first slot runs along the entire circumference of the interior wall.

5. The microwave oven of claim 3, wherein the first slot has a length along the circumference of the interior wall greater than or equal to the diameter of the wire.

6. The microwave oven of claim 3, wherein the first slot has a length along the circumference of the interior wall less than or equal to 105% of the diameter of the wire.

7. The microwave oven of claim 3, the first slot having a depth less than or equal to a depth from the cylindrical collar's interior wall to an exterior wall of the cylindrical collar.

8. The microwave oven of claim 3, wherein the first slot has a height less than or equal to 105% of the diameter of the wire.

9. The microwave oven of claim 3, wherein the first slot is disposed between the sloped end and the flat end.

10. The microwave oven of claim 3, wherein the first slot is disposed along a side of the cylindrical collar having a length greater than a shortest side of the cylindrical collar, and wherein the first slot is disposed further from the flat end of the cylindrical collar than a furthest point of the shortest side of the cylindrical collar is disposed from the flat end.

11. The microwave oven of claim 1, the transmission shaft comprising a second slot along an exterior surface of a portion the transmission shaft within the cylindrical collar, the compression spring comprising an inwardly-bent end extending into the second slot, wherein the second slot has a height greater than or equal to a diameter of a wire that forms the compression spring.

12. The microwave oven of claim 11, wherein the second slot runs along an entire circumference of the exterior surface.

13. The microwave oven of claim 11, wherein the second slot has a length along the circumference of the exterior surface greater than or equal to the diameter of the wire.

14. The microwave oven of claim 11, wherein the second slot has a length along the circumference of the exterior surface less than or equal to 105% of the diameter of the wire.

15. The microwave oven of claim 11, wherein the second slot has a height less than or equal to 105% of the diameter of the wire.

16. The microwave oven of claim 1, wherein the compression spring is disposed between a first lip along an internal wall of the cylindrical collar and a second lip along an external surface of a portion of the transmission shaft disposed within the cylindrical collar.

17. The microwave oven of claim 1, wherein the oscillation mechanism further comprises:
an air-tight, pressurized cavity disposed between a first lip extending inwards from an interior wall of the cylindrical collar and a second lip extending outwards from an exterior surface of a portion of the transmission shaft disposed within the cylindrical collar.

18. A microwave oven comprising:
a cooking cavity;
a magnetron comprising:
a body comprising an anode, a cathode, and one or more magnets; and
an antenna extending from the body that directs microwaves generated by the body to the cooking cavity;
a first infrared camera directed towards the cooking cavity and aligned along a first axis across the cooking cavity;
a second infrared camera directed towards the cooking cavity along a second axis across the cooking cavity and perpendicular to the first axis;
a controller having one or more hardware processors and hardware memory, the hardware memory having instructions stored therein that, when executed by the hardware processors, perform the steps of:
detecting a three-dimensional heat profile of an object being heated in the microwave oven using the infrared cameras;
adjusting a position of the magnetron based on the heat profile.

19. The microwave oven of claim 18, the hardware memory further having instructions stored therein that, when executed by the hardware processors, perform the steps of:
receiving an object name for the object being heated in the microwave oven;
determining a size of the object based on the heat profile;
storing, in the memory, the object name, the size of the object, the heat profile, and a magnetron adjustment pattern based on adjustments made as the object is heated.

* * * * *